(12) United States Patent
Darwent et al.

(10) Patent No.: US 7,136,791 B2
(45) Date of Patent: Nov. 14, 2006

(54) STORY-BASED ORGANIZATIONAL ASSESSMENT AND EFFECT SYSTEM

(75) Inventors: Sharon Michelle Darwent, London (GB); Fiona Incledon, London (GB); Neal Martin Keller, Pleasantville, NY (US); Cynthia Frances Kurtz, Chappagua, NY (US); David John Snowden, Marlborough (GB); John Charles Thomas, Yorktown Heights, NY (US)

(73) Assignee: International Business Machines Corporation, Armonk, NY (US)

(*) Notice: Subject to any disclaimer, the term of this patent is extended or adjusted under 35 U.S.C. 154(b) by 584 days.

(21) Appl. No.: 10/001,948

(22) Filed: Oct. 24, 2001

(65) Prior Publication Data

US 2002/0107721 A1 Aug. 8, 2002

Related U.S. Application Data

(60) Provisional application No. 60/242,954, filed on Oct. 24, 2000.

(51) Int. Cl.
*G06G 7/48* (2006.01)

(52) U.S. Cl. .......................................................... 703/6
(58) Field of Classification Search ...................... 703/6
See application file for complete search history.

(56) References Cited

U.S. PATENT DOCUMENTS 6,292,830 B1 * 9/2001 Taylor et al. ............... 709/224

* cited by examiner

*Primary Examiner*—Hugh Jones
(74) *Attorney, Agent, or Firm*—Daniel P. Morris

(57) ABSTRACT

We describe here a system and method which makes use of "narrative patterns" to assess and affect the state of affairs within and among given organizations and communities with respect to given issues or objectives. Narrative patterns are conceptual structures that result from common sense-making around narrative material elicited from the given organizations and communities and relevant to the given issues or objectives. Through the facilitated emergence of such narrative patterns, options for response are formed and evaluated. Response options include the creation and use of purposeful stories, story repositories, and other resources derived from the collected narrative material.

97 Claims, 4 Drawing Sheets

Fig.1 Group membership
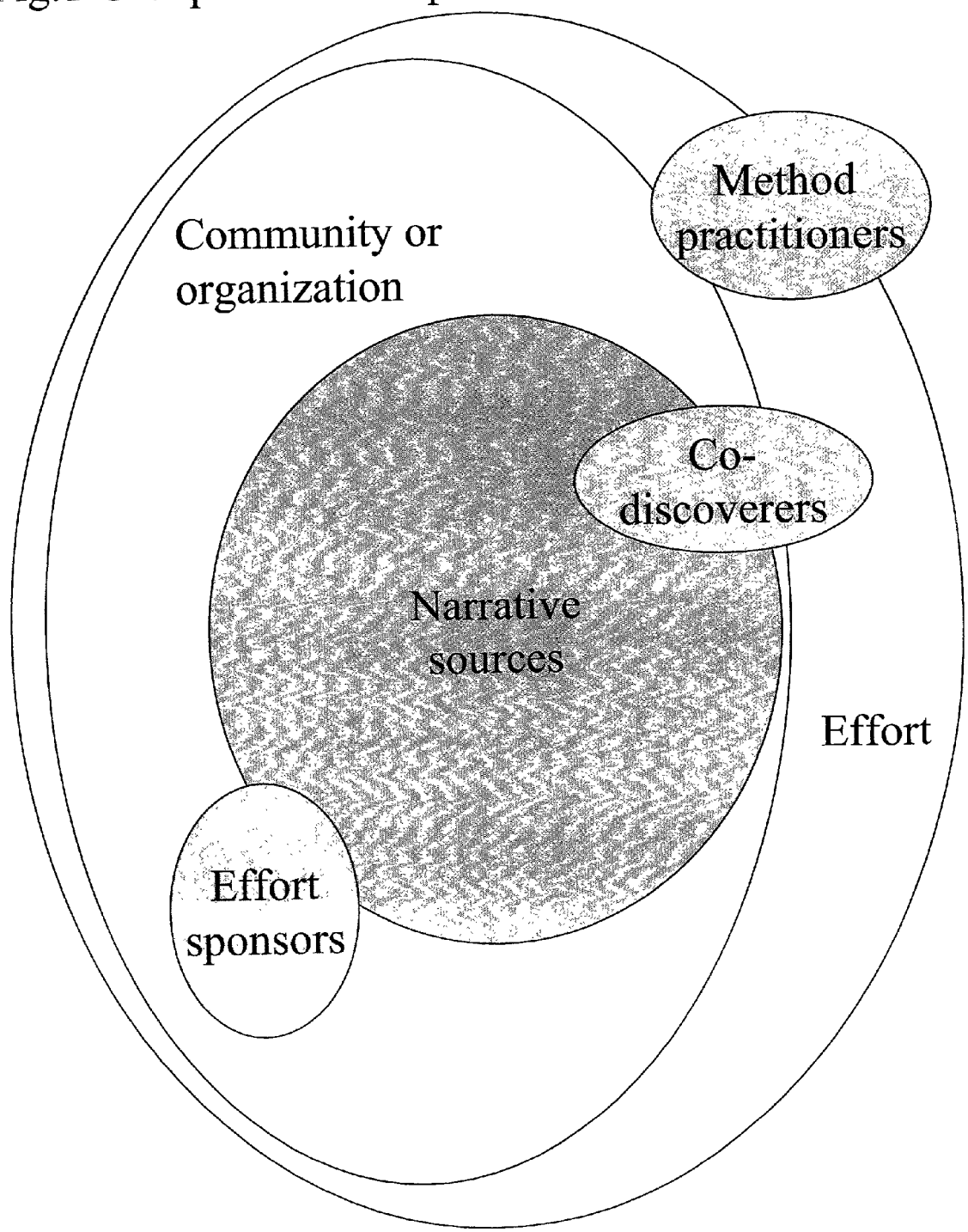

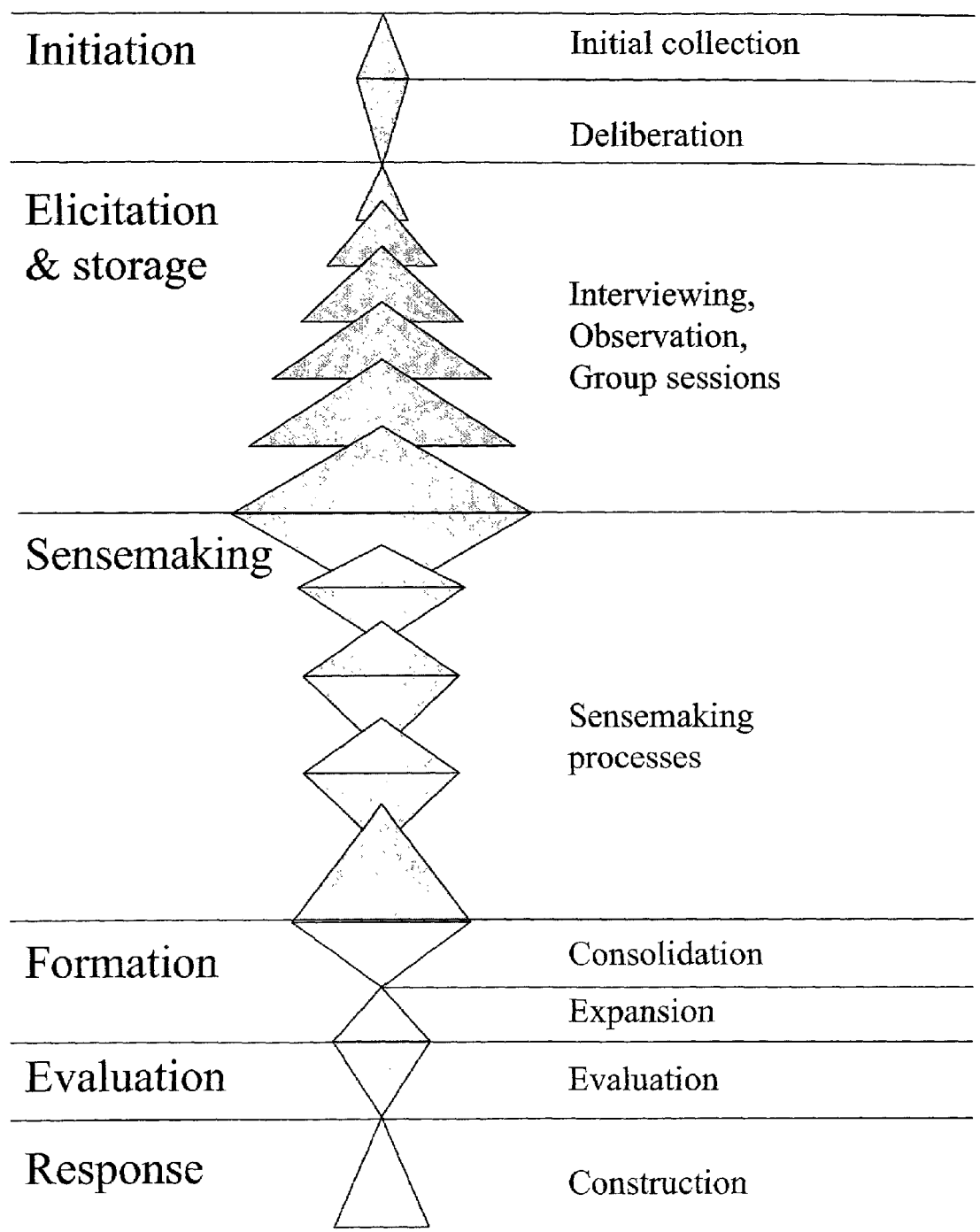
Fig. 2 Information flow during each phase

Fig. 3 Outputs of each phase

| | |
|---|---|
| Initiation | Critical issues, participants, scope, agreements |
| Elicitation & storage | Narrative material including anecdotes and contextual material stored in structured, searchable, viewable fashion |
| Sensemaking | Collectively interpreted meaning based on narrative material, emergent patterns, knowledge structures, insights, understandings |
| Formation | Possible responses grounded in understanding |
| Evaluation | Suggested responses with benefits, dependencies, measurements |
| Response | Purposeful stories, narrative repositories and planning artifacts and plans for their use |

Fig. 4 Methods used during each phase

| | Narrative forms | Disruptive metaphor | Archetypes | Attribute listing | Organizing principles | Sensemaking models | Clustering |
|---|---|---|---|---|---|---|---|
| Elicitation & storage | ■ | ■ | ■ | ■ | ■ | ■ | ■ |
| Sensemaking | ■ | ■ | ■ | ■ | ■ | ■ | ■ |
| Formation | ■ | ■ | ■ | ■ | ■ | ■ | ■ |
| Evaluation | ■ | ■ | ■ | ■ | ■ | ■ | ■ |
| Response | ■ | ■ | ■ | ■ | ■ | ■ | ■ |

STORY-BASED ORGANIZATIONAL ASSESSMENT AND EFFECT SYSTEM

The present application claims priority to co-pending U.S. provisional application No. 60/242,954 filed Oct. 24, 2000. The teaching of which is incorporated herein by reference.

TECHNICAL FIELD

The present invention is directed to Organizational Assessment and Effect System Using Narrative Patterns.

The invention relates in general to any system whereby given organizations or communities are assessed with respect to given issues or objectives, and to systems whereby actions are taken or proposed to create desired effects in organizations or communities with respect to given issues or objectives. Such issues and objectives may be based on highly abstract attributes such as values and founding principles, or they may be based on more concrete attributes such as goals and plans. In particular, the invention relates to the fields of knowledge management, education, organizational development, community development, communication, strategy, planning, oral and written history, induction, retention, merger and acquisition, partnership, preparation of legal cases, brand management, cultural management, intellectual capital management, decision making, decision support, and policy making.

BACKGROUND

The invention provides a unique system for assessing and impacting aspects of an organization or community which affect its collective success in the marketplace or health in the society and its ability to evolve to manage future uncertainties. These organizational aspects are often intangible in terms of assets and challenges, but nevertheless play a strong role in an organization's or community's collective capacity to succeed in its endeavors. Many management theories are based on mechanical models of the organization, which tend to ignore intangible aspects and expect individuals and organizations to act in a machine-like, predictable way. The understandings that have arisen from the study of complex adaptive systems make it clear that organizations are more accurately represented as complex ecologies whose coalescent behavior cannot be easily predicted or controlled. In this context a very old skill can be brought out of the shadows and made valuable use of: the human capacity to tell stories.

Since ancient times human beings have told stories for many purposes, including the transmission of complex knowledge, cultural values and beliefs. Managed and purposeful storytelling can provide a powerful mechanism for the disclosure of intellectual or knowledge assets in organizations. It can also provide a non-intrusive, organic means of producing sustainable cultural change, conveying brands and values, transferring complex tacit knowledge, and supporting decision making and strategy. In any human organization or community stories and storytelling are like an underground river, not easily visible but intricately bound up in the way the organization and its members think and act. Learning to understand and navigate that river, not only at points where it wells up above ground, but throughout its course, creates a unique and powerful device for those who wish to maintain or improve the collective health or success of any organization or community. Navigating the underground river of story without sufficient skill and knowledge is fraught with peril, however, because stories, like all powerful things, can be dangerous. If used poorly they can even cause harm.

Since story became fashionable an increasing volume of practice focuses on constructing better or more meaningful stories. This is also one of the most fertile sources of revenue for those transferring the traditional skills of storytellers, script writers, journalists and others into an organizational setting. All organizations have messages that they wish to convey both internally and externally. Effective communication needs a story to be told in a convincing and attention grabbing or retaining way. In consequence, it is not surprising that the novelty of a Irish Seanachie at a company event, or a group of actors using techniques of value transfer or reinforcement traceable to the forms of medieval morality plays, can have a considerable impact on audiences jaded by a surfeit of corporate videos, tightly scripted messages and idealized examples of "best practice".

There are several dangers with entering this field enthusiastically but without adequate understanding. All too frequently there may be resistance in the audience to being "told a story". A fictional or allegorical story may engender cynicism or dismissal: "so now they are telling us fairy stories" or "that was very entertaining, but why can't they just say what they mean", to take but two examples. A factual story is even more fraught with peril: to tell the truth, the whole truth and nothing but the truth requires both a prestigious feat of memory and a suspension of the normal human tendency to reinvent history to confirm with the requirements of the present. More importantly, the bare facts are boring; they do not make for a compelling story. In order to create a story there is a need to select the most compelling of the facts and provide appropriate emphasis: create tension, introduce clear protagonists, build a proper context, spell out the message—in other words all the tools and techniques of a script writer or journalist. The danger here is that the emphasis and selection may not correspond with the experiences of other people in the organization. Some of them may have been a part of the original story, or know people who were. It only takes one person to say "but that's not what really happened", or "but that's not the complete story" and the whole process is undermined.

The label of propaganda, once won, is difficult to shake off, and it is an easy one for an organization to form. One of the dangers here is the "Janet and John" story. Janet and John are the two central characters of a series of books used to teach reading to British four and five year olds some years ago. The trouble with Janet and John are that they are so good; it is enough to make any self-respecting and intelligent child sick. All Janet and John stories ended happily as any naughty behavior received inevitable punishment and moral or noble actions received reward and recognition. The problem is that most centrally dictated communication in organizations takes a Janet and John approach. It tries to tell things as they should be in some idealized vision of cooperative behavior and sacrifice to achieve corporate goals. Stories of best practice hold up a team or division as a role model for others to copy; they are portrayed as fulfilling the Chairman or CEO's vision, embodying the organizations core values of customer satisfaction, hard work and so on. Within the context of senior management they may even be seen to have been successful, partly because senior managers are all too often told the stories they want to hear and are insulated from negativity; partly because most human beings tend to see what they want to see, particularly when they have just spent large sums of money on a communications or cultural change program. Several years of using techniques derived from anthropology to capture water cooler stories after some official act of story telling shows a near universal occurrence of "anti-story": the cynical and naturally occurring counter reaction to a official story of goodness that does not reflect the reality of the audiences experiences or perception of those experiences. In organizational change and communication, perception is all.

A survey of current literature and practice identifies four major approaches to the use of stories within an organizational context. Although all of these approaches have some use, some are more complete and purposeful than others, and none includes all of the components of the system described here or achieves its outcomes. The approaches are as follows.

Narrative research

The use of narrative as a research tool grew in prominence with the growth of postmodernism and its emphasis on the authenticity of narrative. A broad range of literature contains several examples of capturing and interpreting such anecdotal material. Most recently Gabriel's book *Storytelling in Organizations* (2000) provides a useful review of literature in this area. Gabriel summarizes the narrative research approach thus:

" . . . stories open valuable windows into the emotional, political, and symbolic lives of organizations, offering researchers a powerful instrument for carrying out research. By collecting stories in different organizations, by listening and comparing different accounts, by investigating how narratives are constructed around specific events, by examining which events in an organization's history generate stories and which ones fail to do so, we gain access to deeper organizational realities, closely linked to their members' experiences."

Narrative organizational research methods depend on the researcher to provide the analysis as an "expert," and do not attempt to use the material to construct stories in a dynamic discovery process. Also, most research in this area is reductionist in nature, attempting to identify and isolate "facts" amenable to rational analysis.

Anecdote Enhancement

A second group of methods creates or reflects on actual organizational stories and enhances or expands these to make a point. Denning's book *The Springboard* (2000) is a lyrically told story which weaves together several actual stories from the World Bank. Another example is 3M's practice of using "strategic stories" in business planning (Shaw et al. 1998). Anecdote enhancement can be effective; however, there are three problems with it.

I. Clumsily enhanced anecdotes can misfire. Told by a gifted storyteller who resists the temptation to embellish the story or skip inconvenient elements—and few resist this temptation—an enhanced anecdote can work. The danger enters when readers seek out the real "facts," which may differ from the enhanced version of the tale, or when readers question whether the story's context is repeatable. "That would never be allowed if I did it"—a common anti-story response—is only marginally better than "If you believe that, you'll believe anything." On the other side of believability is the danger that the story will be too close to the day-to-day experiences and reality of its audience. If a story fails to take its audience members outside of themselves in order to gain new perspective, it may instead reinforce existing prejudice and cognitive filtering.

II. This approach precludes the use of fictional stories, which can provide powerful insights and access to deeper truths.

III. We have seen a tendency, reinforced by techniques such as appreciative inquiry, to look only for positive stories. While this may be valid in individual counseling, it is not advisable in the context of organizational storytelling, where the most powerful and useful stories are often negative (Snowden 2000).

Fictional Exploration

A third group of methods freely embraces fiction, seeing storytelling as a means of conveying meaning, stimulating response, and enhancing understanding of complex issues. An illustrative example is a recent monograph from The Spark Team (2000), which contains a fully developed "Treasure Map Fable." The fable's stated intent is to "develop a common understanding through the exploration of the ambiguity—whilst accepting that it will always be there." Annotation links in the fable text connect its metaphors to real-life problems and solutions. For example, in the following excerpt:

"The Sceptic was teamed up with the Eternal Optimist, a nice chap with a sunny disposition, but he hadn't been living in the kingdom for long, and the Sceptic thought that people wouldn't talk to him. They barely opened up to each other . . . . "

The word "kingdom" is followed by a link to an item labeled "Elicitation" and beginning thus:

"For interdisciplinary teams to work effectively, they need to be considered as creating new knowledge domains, consciously using techniques such as elicitation, which is a kind of mapping of perceptions . . . . "

Thus the fictional format in this quote tackles real issues indirectly using metaphor and analogy. There are, however, dangers in the fictional exploration approach.

I. The facilitator, analyst or story writer has a major impact on the project in terms of content as well as process, and this influence can be dangerous and potentially manipulative.

II. The issue of audience resonance is more haphazard with the use of fiction than with the use of purposeful stories based on anecdotal fragments, as is advocated in the system described here.

III. More cynical audiences may see the fictional exploration approach as trendy, or at worst propaganda dressed up in childish format, and it may lose impact as a result. The Spark example does not fall into this danger, but it was constructed by gifted individuals with many years of experience. For story-based techniques to be pervasive, they must be scaleable. The best use of storytelling is a balance of science and art: science for scalability and art for impact.

Story as Story

The final group is interested in story per se, wherever it occurs. It includes folklorists, journalists, oral historians, ethno-cultural specialists, professional storytellers and writers, filmmakers and others. Valuable resources in this area include McKee's inspirational script writing work *Story* (1997), Campbell's seminal work on archetypes *The Hero with a Thousand Faces* (1972), and Kransdorffs journalistic *Corporate Amnesia* (1998). Many story associations and festivals around the world celebrate traditional forms of story, often in a modem context. This broad base of expertise provides a hugely valuable resource base for work in organizational contexts. Indeed, some knowledgeable story professionals work in and with organizations. Some people in this group, however, believe that work in organizational storytelling involves a loss of purity in the storytelling arts. To some extent this may be true; however, the purpose of organizational storytelling is not to tell a good story, but to achieve a defined purpose. Purpose and form are compatible but not always contiguous.

All people in an organization constantly tell anecdotes, both about their organization and about their own personal lives and aspirations. These anecdotes are told around water coolers, across desks in an open plan office during a quiet period, over the lunch table, in internet chat rooms and in the countless opportunities (both physical and virtual) that are available in any organization. Unlike in a formal interview, we are off guard when we tell an anecdote. It reveals more than we may have intended, and taken collectively with the anecdotes of other individuals with whom we work it can reveal much of the culture of an organization. This culture can be revealed and more importantly represented by the emergent meanings present across a range of anecdotes and in the underlying value, rule and belief systems revealed by the messages, both explicit and implicit, that are revealed.

The teaching of the following references and any other reference cited herein are incorporated herein by reference.

Abelson, R. (1981). The psychological status of script. *American Psychologist* 36: 715–729.

Bakhtin, Mikhail M. (1981) The Dialogic Imagination (Emerson. C. & Holquist, M., translators). Austin: University of Texas Press.

Beyer, H. and Holtzblatt, K. (1998) *Contextual design: Defining customer-centered systems*. San Francisco: Morgan-Kaufman.

Branigan, E. (1992). Narrative Comprehension and Film. New York: Routledge.

Brunvald, J. H. (1998) *The Study of American Folklore* (4th Ed.) New York: Norton.

Campbell, Joseph. (1972) *The Hero with a Thousand Faces*. Princeton University Press.

Denning, Stephen. (2000) *The Spring Board: How Storytelling Ignites Action in Knowledge Era Organizations*. Butterworth Heinemann.

Dervin, B (1998) "Sense-making theory and practice: an overview of user interests in knowledge seeking and use" *Journal of Knowledge Management* Vol 2 No 2 pp36–46.

Gabriel, Yiannis. (2000) Story Telling in Organizations: Facts, Fictions, and Fantasies. Oxford University Press.

Glaser, B. G., & Strauss, A. L. (1967) *The Discovery of Grounded Theory*. Chicago: Aldine.

Kawakita, Jiro. (1986) *The KJ Method: Seeking Order Out of Chaos*. Tokyo: Chuokoron-sha. ISBN 4-12-001517-3 (In Japanese)

Kransdorff, A. (1998) *Corporate Amnesia*. Butterworth Heinemann. M

McKee, Robert. (1997) *Story: Substance, Structure, Style, and the Principles of Screenwriting*. Harper Collins.

Shaw, G., Brown, R., & Bromiley, P. (1998) "Strategic Stories: How 3M is Rewriting Business Planning." Harvard Business Review May-June.

Snowden, D. (1998a) "I only know what I know when I need to know it—embracing the active management of tacit knowledge" *Knowledge Management* Ark Publications March 1998

Snowden, David. (2000a) "Organic Knowledge Management" three part article in Knowledge Management 3(7) April 2000 pp 14–17; 3(9) June 2000 pp 11–14; 3(10) July/August 2000 pp 15–19

Snowden, David (2000b) "Story Telling and Other Organic Tools for Chief Learning Officers and Chief Knowledge Officers" in In Action: Leading Knowledge Management and Learning ed. Bonner, Deed ASTD (www.astd.org)

Sobel, Dava. (1998) *Longitude*. Fourth Estate.

Spark Team (2000) Story Telling, Stories and Narrative in Effecting Transition. Spark Press—electronic publication obtainable from sparkteam@sparknow.net Weick, K. E. (1995) *Sensemaking in Organizations*. Thousand Oaks, Calif.: Sage.

SUMMARY OF THE INVENTION

This invention is a system and method which makes use of "narrative patterns" to assess and affect the state of affairs within and among given organizations and communities with respect to given issues or objectives. The invention's principal means of achieving its outcome is the realization of common sensemaking around a body of collected narrative material, together with tested methods for the capture, storage and presentation of narrative material and the delivery of constructed purposeful stories. This invention is unique in its combination of the systematic collection and study of anecdotes, the common sensemaking, and the dynamic creation and use of purposeful stories and other response mechanisms.

The system comprises six phases, as follows: initiation, in which various preparatory, selective, exploratory and purpose-setting activities are carried out as needed; elicitation, in which "narrative material" ("anecdotes" and "contextual material") is collected from the given organizations or communities; storage, in which the collected narrative material is indexed and arrayed in such a way as to be useful to the overall process; "common sensemaking", in which the given organizations or communities come to a collective understanding of patterns emergent in the collected narrative material which address the issues or objectives at hand; option formation, in which various possibilities for appropriate response are identified; option evaluation, in which the identified options are characterized, appraised and prioritized; and response, in which an action is taken in order to affect the state of affairs.

Advantageously, such an assessment and effect system is applicable to a variety of organizational and community domains including but not limited to knowledge management, education, organizational development, community development, communication, strategy, planning, oral and written history, induction, retention, merger and acquisition, partnership, preparation of legal cases, brand management, cultural management, intellectual capital management, decision making, decision support, and policy making.

BRIEF DESCRIPTION OF THE DRAWINGS

FIG. 1 illustrates the overlapping group memberships of participants.

FIG. 2 shows the conceptual focusing (broadening) and integrating (narrowing) that occurs during all phases of the system.

FIG. 3 lists the outputs of the activities occurring during the execution of the phases of the system.

FIG. 4 indicates the methods used during the execution of the phases of the system.

DETAILED DESCRIPTION OF THE INVENTION

The invention comprises the following phases: initiation, elicitation, common sensemaking, formation of options, evaluation of options, and response. The elicitation and sensemaking phases are always included, but the other phases may be more or less evident depending on the nature and scope of the effort and the characteristics of the given organizations or communities. There is also some interaction among phases, in the sense that some activities occurring in the same relatively short time frame may address more than one of the phases. For example, a single workshop may include elements of elicitation and sensemaking, or even sensemaking and some response. FIG. 2 shows the conceptual focusing (broadening) and integrating (narrowing) that occurs during all phases of the system (these terms will be defined later) while FIG. 4 indicates the methods used during the execution of the various phases. FIG. 3 lists the outputs of these activities.

(To reduce verbiage, we will hereafter use the term "community" to mean "organization or community". We will also use this term to denote multiple organizations or communities.)

Initiation Phase

During the initiation phase, the primary focus is on planning the activities that will follow. Depending on the initial focus of the effort and the essential characteristics of the community, any or all of the following activities may take place. Actually, the entire initiation phase is optional in the sense that the remainder of the method can take place without any of the activities under this heading. A particular instantiation of the method may forego an initiation phase, for example, if it is a very small effort.

Initial Narrative Collection

Some initial narrative collection may be done in order to inform the setting of purpose. Initial narrative collection will usually involve a small number of exploratory interviews, observations, or group sessions (see below for descriptions of these methods). The outcome of initial narrative collection may be a better understanding of purpose or significant issues that later activity should address. For example, if one were conducting an effort to look at knowledge transmission from retiring engineers, one might first speak to retiring and new engineers looking for issues in knowledge transmission.

Participant Selection

Participants may be selected from the community, both as narrative sources and co-discoverers. Narrative sources are members of the community who contribute narrative material. Co-discoverers are members of the community who participate in the effort beyond the contribution of narrative material. As shown by FIG. 1, the two groups need not be mutually exclusive; indeed, there may be a range of participation in the effort among members of the community. Participant selection may benefit from a few different sources of information, thus:

I. Published methods for community mapping such as organizational network analysis and social network analysis may be used to identify participants with essential knowledge or social connections within the community. For example, a social network analysis might reveal that a particular secretary is the best source of knowledge about informal social networks within a particular division.
 II. Initial training of co-discoverers may influence the pool of participants, such that some become more and some become less involved in the effort.
 III. Interviews with informants within the organization may provide or change the lists of potential participants. For example, an interview with a particular executive, though not obviously any more useful than other interviews, might provide essential information because that executive happens to be on the softball team and knows a range of people throughout the organization.
 IV. A target mix of roles designed to maximize storytelling potential may be decided upon (e.g., novices and experts, users and support staff). The mix of roles creates conditions for knowledge exchange greater than those that would be obtained by bringing together participants with other backgrounds.

Education

Co-discoverers may be educated in basic issues and techniques. This may be done via participatory workshops, by master classes, or by the distribution of material to be read.

Deliberation

Key issues, questions or objectives may be identified and refined as a result of initial collection of material and discussion. For example, it may be ascertained that the initial question is too superficial and that a deeper question should be addressed instead. Scope, scale and prioritization decisions may be made considering the focus of the effort and the characteristics of the community. For example, it may become apparent during initial collection that the effort will not succeed unless people in the Tokyo office are also included in the effort.

Measurement

Measurement methods for determining the success of the effort may be identified. For example, continued narrative collection at regular intervals may be planned to track a changing cultural value which has been identified as a goal of the effort.

Covenanting

Purpose-setting or "covenanting" meetings may be held. These meetings may include co-discoverers and sponsors and may involve the review of initial material collected and conclusions drawn. In these meetings agreements may be made as to the critical issues, scope and measurement of the effort. In addition, the contribution of different groups or individuals in the effort may be agreed upon at this time.

Elicitation Phase

During the elicitation phase, "narrative material" is collected in the form of a range of told "anecdotes" (naturally occurring stories) and surrounding "contextual material" (observations and related data) from people connected in some way to a certain issue and/or belonging to a certain community. This phase produces a body of materials that may include written observations and field notes, discussion artifacts, video and audio recordings, and transcripts. It is important to collect not only a sufficient quantity but also a diverse array of narrative material from many perspectives. Many of the methods described below have been specifically developed to maximize the collection of diverse perspectives.

The most fundamental requirement of elicitation is not to influence the anecdotes that one is told by a community. Structured interviews, questionnaires and conventional workshops tend to produce anecdotes that conform to the script of a community. Individuals in large organizations soon learn how to adopt camouflage behavior as a survival technique. The smaller the footprint of the investigator the more valuable the material captured.

Several methods (detailed below) are used as needed to collect narrative material depending on available time and expertise, and on the scope and purpose of the endeavor. All of the methods involve some form of conversation with selected members of organizations and the elicitation of narratives: firsthand and secondhand experiences, rumors, legends, and the like. This phase is optional in the sense that the remainder of the system may also function with material acquired by other means (e.g., from news feeds).

Elicitation may take place by three major categories of activity: observation, interview, and group session.

Observation

Observations may be carried out in the context of the everyday life of the community under consideration. Methods used for observation are drawn from techniques in postmodern research and in cultural and social anthropology as well as other disciplines, including the study of medieval models of apprenticeship. Some general rules for observation are as follows:

I. Observers attempt to blend in to the background of the subject's environment, often filling subservient roles (getting coffee, carrying bags, sweeping floors) to set subjects at ease. In general the methods of participant-observation are used.

II. Observers avoid influencing the outcome of the observation by separating their opinions from their objective observations. Such devices as confining observations and opinions to separate columns of a notebook page are useful.

III. Observers suspend judgment, especially of behaviors they find disagreeable; they accept uncertainty and forego "nailing down" results or solutions.

IV. Observers respect the privacy and confidentiality of all subjects.

Interviewing

Methods of anecdote elicitation via one-to-one interviewing draw on sociological and cultural methods, especially those used in oral history collection. Interviews for anecdote collection are open-ended, with no fixed protocol. Instead open questions, discursive questions, disruptive ideas and indirect inquiry are used as appropriate in response to the flow of the interview. One useful technique is to interview the individual in the context of his or her work so that clues such as pictures on walls, trophies and even the layout of the room and the attitude to interruption can provide clues and opportunities for indirect questions. The context of the interview creates material around which the subject can talk without directly bringing up the subject. Interviewers assume an informal yet professional demeanor, displaying curiosity and interest yet respecting permission, privacy and confidentiality. Another useful technique is to use young interviewers such as schoolchildren, whose naivete and curiosity can reveal important but unspoken trends, values, beliefs, and assumptions.

Group Sessions

In a group session a selected group of people is brought together either physically or virtually for a specified period of time. The groups selected for storytelling sessions generally share experiences in the area of concern but also provide some variation in other respects such as experience or role.

Story Circle Group Session

The "story circle" group session requires relatively high skill on the part of facilitators (though not necessarily high involvement in the session). In a story circle a selected group of people is brought together physically or virtually, typically for a day or half-day (or if in a virtual story circle, for a longer period of time). Of those who run the story circle, roles may include lead facilitators, assistant facilitators, and "scribes" who take notes. Roles are assigned using an apprentice model; thus one must scribe a story circle before leading one. Facilitators are trained in standard narrative forms and techniques such as can be found in many textbooks of narratology and script writing. Story circles are recorded in several ways depending on the purpose, scale and circumstances: scribes may take notes during the session; participants themselves may create artifacts during the process of participatory activities; and audio or video recordings may be made.

During the group session, facilitators use several methods in a bag-of-tricks style depending on the purpose and flow of the session. The methods used include the following.

I. Dit spinning. This is a British Navy phrase meaning the telling of escalating stories of experience; "fish tales" is another name for the same thing. In a social setting people often swap experiences, and there is a natural tendency for the related experiences to escalate in degree. If one person tells a story of a harrowing or amusing experience, another person might tell a better one, and so on. The desire to tell a better story overcomes the inhibitions of conformity with the official script. Facilitators help set up the escalation by asking for "best" or "worst" experiences, then helping participants pull out of each "dit" as it reaches a natural peak and start another.

II. Turning point identification and alternative history construction. These provide a powerful means by which a group can explore fictional space and stimulate the creation of a richer collection of narrative material. Any anecdote will have a number of turning points, where a small change in a decision or some "environmental" factor could have changed the outcome. Exploration of these alternative histories is a powerful source of often truthful anecdote. For example, once the official history of a project has been told, participants may be asked to identify three to seven points in that history where a small change would have resulted in a radically different outcome (most frequently failure instead of success or vice versa). Participants are then asked to construct an alternative fictional story for each such turning point. The result is that four or eight anecdotes are captured rather than one. Often more truth is revealed through the alternative histories than is achieved through the official history.

III. Shifting character or context. This method can elicit a higher level of diversity in the narrative material. It is also useful if there is animosity or little cultural cohesion in the group, because fictional space is less threatening. All stories have a structure, with antagonists, scenes, conflicts, motivations and so on. Having identified a substantial anecdote—this does not work with uncomplicated ones the —group is helped to deconstruct the anecdote into its dramatic elements and then asked to retell the story with an appropriate change. For example, participants may be asked to change the anecdote's protagonist into an antagonist. The change provides a new perspective on the anecdote and reveals greater truths.

IV. Archetypal story elicitation. This method of allowing disclosure without attribution is a variation of a technique long known to parents: children are sometimes more willing to admit responsibility for an act of mischief when the convention is accepted that "It was Teddy that did it." Within a group session participants may be helped to identify archetypal characters revealed by the anecdotes they have collected; this is viable when the number of anecdotes reaches a critical mass (normally in excess of twenty). The process can be facilitated by the use of cartoonists (who draw and redraw the characters until the participants are satisfied with the representation of the archetypal characters) or actors (who act out scenes using the described characteristics of archetypal characters until the participants are satisfied). The archetypes must not be specific to an individual or individuals known to the group. Once the archetypes are established, possible future situations can be used to elicit anecdotes from the group using the archetypal characters. Also, past events can be described again using the fictional device of "How would our archetypal characters have handled this?" The purpose is to use fictional forms to explore a wider range of possibilities and create a richer repository of narrative material.

V. Story construction. In this method the techniques used for purposeful story construction, described below, are used by participants in elicitation sessions. Constructing a fictional story based on real anecdotes reminds people of other related instances to recount, and increases the meaningful diversity of collected anecdotes.

VI. Role playing. This wholly fictional method provides an opportunity for participants to consider the viewpoints, opinions and behavioral drivers of other individuals in their organization. It is also a fresh way to share experiences when interest is flagging. A role playing scenario is established that is relevant to the group. It should focus on a problem typical to the communities under study. Next the context and the characters in the role play are set up, then the group is asked to consider how they might solve such a problem. In solving this problem they are applying their knowledge in context. They will make decisions, create solutions, use assets and draw on experience to resolve the problem. The elements in play are observed and noted by the audience as the scene is acted out.

VII. Metaphorical elicitation. This can also be a powerful elicitation technique for anecdotes. Its use can provide a common reference for the group that moves them away from current concerns and prejudices into a safer space, but a space that is disruptive in the association of ideas that it stimulates. As an example, the book *Longitude* by Dava Sobel (1998) describes how in the eighteenth century the British government offered a rich reward to anyone who could discover a means to measure longitude at sea (a measurement that would dramatically improve the safety of seafaring). The solution was found by a furniture maker in the English Midlands, who proposed that time was the most accurate measure of longitude. Longitude could be measured by examining the time difference from Greenwich Mean Time at midday. Because the "experts" in London did not expect such a solution, they denigrated the furniture maker's solution for decades, and never fully paid him the substantial reward. Given that story, it is much easier to ask people to think of instances when someone under their management has been treated like the furniture maker than to ask the same people to think of instances when they have mistreated people out of ignorance and stupidity. The metaphor allows people to understand and discuss the issue at a deeper and less personally threatening, but still disruptive level. It allows people to "own up" to bad practice that they might otherwise attempt to excuse. Common childhood stories, examples from other industries and disciplines, science fiction, and historical references can all provide useful metaphors for elicitation.

VIII. Best/worst event identification. Participants are asked to think of worst or lowest moments of a project or their work, then draw pictures of them and describe them to the group, telling the anecdote surrounding the event. After this is complete the exercise is repeated with highest or happiest moments. This technique is especially useful in lessons learned efforts when people are looking back at what they have learned during a period of time. It helps people find incidents that have the greatest importance (for whatever reason) to tell about.

Story Roundtable Group Session

The "story roundtable" group session uses a fixed structure, little facilitation expertise, and a short session time (about an hour). Its output is less rich and complete than the story circle but is adequate for many purposes. Roundtables are most useful as a complement to story circles when time and expertise is limited.

Roles in running the roundtable are restricted to facilitator and helper/observer. The facilitator speaks, gives directions and moderates the discussion. The helper makes sure the recording equipment is working, answers questions, and takes notes. Unskilled facilitators and helpers may rehearse the roundtable before starting the series, and they may "debrief" after each roundtable to improve their performance.

People who typically fill "helper" roles such as trainers and support staff often require a special word before the roundtable. They are often by themselves and others as primarily advice givers. They need to understand that the roundtable is not a class and that they shouldn't walk around dispensing advice or answering questions, even if people want them to. You might need to tactfully explain that they are being asked to attend the roundtable to bring together people who might have interesting stories to tell each other. It is often necessary to explain that their own experiences, from their point of view, will be very valuable (and indeed they usually are). It is also important to explain to other people in the roundtables that the "helper" people are there to participate, not to answer questions.

The eight to twelve participants in each roundtable are chosen based on a target mix of roles designed to maximize storytelling potential (e.g., novices and experts, users and support staff). The mix of roles creates conditions for knowledge exchange greater than those that would be obtained by bringing together participants with similar backgrounds.

Participants are prepared for the roundtable by the following means.

I. Participants are given a series of brief messages with increasingly deeper contextual description of the activity (e.g., invitations and reminders). This series not only gives participants multiple chances to notice the instructions, but also helps participants become more aware of what to expect. Handouts in particular serve as physical manipulables participants can use together to discuss points and illustrate stories as they are told. Preparation is especially important when elicitation time is greatly limited.

II. On arriving at the roundtable, participants are given handouts, which contain "memory joggers", or facts about the subject domain under discussion; "story starters", or incomplete phrases that, when completed, start a story (such as "I remember the time when . . . "; and "experience inflection points", or roadblocks, breakthroughs, mysteries, misconceptions, and surprises. This is helpful to orient people to the nature of the activity they will undertake, and it also critically serves as a physical artifact to aid discussions.

III. Participants are promised some sort of "gifting" reward (often food, food coupons and/or a gift) for attending the roundtable. These rewards are presented when participants arrive at the roundtable. This helps create an atmosphere of positivity that encourages participants to "give something back" in the form of participation.

IV. The desired storytelling behavior is never dictated but always suggested by example and by creation of a self-fulfilling prophecy. Facilitators tell participants that stories "just tend to happen naturally"—and then they typically do.

The roundtable consists of three parts.

I. After a brief introduction to the purpose of the roundtable, the facilitator models the storytelling behavior by telling a story to the whole group. This story is specifically chosen to catalyze storytelling: it is engaging and instructive, and is taken from the subject-matter domain and from the community if possible. The story is selected by the roundtable facilitator alone so that it has personal relevance, and is prepared before the roundtable by repeatedly telling it to various audiences and improving its impact.

II. Participants are asked to gather in small groups and reflect on their experiences in the subject domain. They are asked to choose one story to tell the larger group after the exercise is finished. The small-group task is actually a trick: the outcome of the task (to pick the "most interesting" story to tell in the large group) is less important than the stories they tell while attempting to complete the task. In fact the small-group exercise generates the bulk of the useful stories. The small-group exercise also creates an intimacy in which participants feel more welcome to share personal experiences than they might in the large group. The facilitator and helper deliberately produce "cover" while the small groups are talking—background conversation or music—that creates a "cocktail party atmosphere" that leads to more natural storytelling.

III. Small-group stories are shared in the larger group and other stories follow spontaneously. The facilitator intervenes only to ask each group to tell its chosen story and to keep the discussion on track if necessary.

The entire roundtable, including all of the small group conversations, is recorded via small, unobtrusive cassette recorders.

One success factor for the story roundtable is awareness of popular and predictable misconceptions about narrative. People often think a story is an opinion ("That's my story and I'm sticking to it"), a lie ("But this isn't a story, this is true!"), a joke ("I've got a great story. This guy walks into a bar . . . "), only for children ("Once upon a time. How's that?), and only from Hollywood ("I've had some experiences with this, but I don't really think I have any stories."). All of these responses can be countered in two ways: by making sure the modeled story does not fall into any of these categories, and responding whenever the storytelling starts to move into any of these categories and steering it back to narrative.

The roundtable method's efficiency for generating useful stories relies on several aspects of the method specifically designed to maximize storytelling: the management of expectations; the mix of participants; the modeling of storytelling behavior; the combination of small and large group processes; the indirect suggestion of storytelling behavior; and explicit attention to group interactions.

The entire roundtable process takes one hour, excluding preparation. This short time frame is advantageous (a) for getting participants to agree to participate in the first place, (b) for increasing the diversity of collected material, since there is time for more roundtables than would otherwise be possible, and (c) for reducing the facilitator time required to carry out the method.

These components combine to create a roundtable method in which the maximum number of useful stories of real experience is collected given a minimum of participant time and facilitator training. Because the method has relatively few critical success factors, it is robust and adaptable.

Self-Running Group Session

In this type of session any or all of the activities described in the story circle and story roundtable sessions are used, but there is no facilitator present. Participants work completely from prepared materials—cards, multimedia screens, web pages, or just simple sets of instructions—and make their own decisions about which of the provided activities they will carry out. This method is most useful when wide input is desired (for example via an intranet), when participation is unpredictable, and/or when the effort is exploratory. Participants record the session, fill in forms, and/or deliver constructed artifacts to the project sponsors or method practitioners. Features which may be present in self-running group sessions are as follows.

I. Concurrent streams. Because groups with different characteristics may participate in the self-running group session, it is important that workshop materials feature at least a few concurrent levels of explanation at different levels, so that participants can elect to receive more or less instruction as they carry out the activities. For example, a main set of instructions may have many detail "spur lines" hanging off which can be explored if a group has interest.

II. Multi-perspective games. Because groups interacting without the intervention of an experienced facilitator may run into groupthink and entrainment of ideas, it is important for the exercises to enhance multiple perspective taking. One useful technique is the use of "matching games" in which participants place or discuss ambiguous items designed to engender discussion that breaks stereotypical or entrained expectations before engaging in the collection of narrative material.

III. Accumulation. Output from previous group sessions may be made available to participants starting a session, so that many self-running sessions may produce emergent results together. For example, archetypes derived from previous sessions may be described or drawn (possibly in cartoon form) on a web site, and session participants may be asked to react to the archetypes and merge their archetype creation with that already collected. This is a case where the elicitation phase may overlap with the response phase: the cartoon representation of archetypes on a web site may provide a safety valve for dissent and an early detection device for management. Participants in group sessions might select existing archetypal cartoons and construct fables using templates, for example, which allows the group to safely tell stories which otherwise might be buried in informal conversation alone.

Virtual Story Gathering Session

The above techniques assume the physical presence of the individuals involved in relating anecdotes. This is the easiest way to manage anecdote elicitation, but it is not always possible. Virtual story gatherings require a greater amount of energy to sustain participation than do other group session types because the physical triggers and indicators are not present. In a room with others we apply ourselves, and if we do not, the lack of participation is clearly visible to the group as a whole. Social pressure involves us even if interest does not. In a virtual community, this sense of group awareness is far more difficult to create. There are usable models in the virtual world from which one can draw in starting a virtual story gathering. Spending time in one of the multi-user games available on the internet may help in understanding the type of work that has to be done to set up a virtual story gathering. Some physical-presence techniques will transfer if the virtual story circle is synchronous, with all the actors present and interacting, but it is frequently necessary and often advantageous for the virtual story gathering to be run asynchronously, with participants joining and leaving at different times and places. In the virtual case the time horizon may be weeks rather than a single day.

One feature of virtual communities is particularly useful for anecdotal elicitation. We know that virtual communities allow people to adopt alternative persona, or to be perceived in radically different ways. Virtual anonymous environments can also encourage confessional behavior, as seen on public web sites active in this area. The use of anonymity and multiple persona for self-representation is best confined to short-term interventions. It permits two types of activity that are useful in the process of knowledge elicitation:

I. Participants can experiment with ideas and experience, confident in the knowledge that there is no direct attribution. For example, a normally cautious individual may develop a "risk taking" personality that reveals anecdotes and ideas that would normally damage the person's desired profile within the company.

II. Participants can reveal evidence of cover ups, lucky escapes, and other embarrassing incidents (to themselves or others). Of course, such contributions may be malicious; it is important to remember that material arising from such exercises has to be used with care. For this reason it is usually best to have the environment managed and interpreted by a third party.

Storage Phase

During this phase, the collected narrative material is stored in a structured fashion so that it is easily searchable and viewable for study, discussion and reporting. Storage may be more or less emphasized depending on the nature of the project: how much isolated study will take place, how long the project goes on, what sorts of outputs are expected, whether a virtual collaboration is going on (in which case written content is more likely to be important), and so on. There may be a variety of storage modalities as well, from video or audio tape to transcripts to metadata to drawings to photographs of workshop arrangements. However, the following features of the storage phase should always be present.

Meaningful Indexing

Items in the stored base of narrative materials are indexed by distinctions that are central to the elicitation and sensemaking phases, such as archetypes, metaphors, turning points, and the like. For example, anecdotes may be annotated with metadata corresponding to the anecdote's form (e.g., protagonist, antagonist, plot twists), information content (e.g., key messages, values, knowledge exchanged), and role in the community (e.g., source, purpose, affect on audience).

Multiple View Taking

The base of stored information is presented such that the items can be arranged in relation to any of the important dimensions of indexing, either at once (juxtaposed) or sequentially. For example, one might enter a body of narrative data, then compare the archetypal content across all the stories at a glance, then cross-reference it with a view of the audience reaction for all the stories. By providing such multi-perspective capabilities one can improve the sensemaking process so that interpreters can gain a richer understanding of the whole body of material.

Prioritization

The base of stored information includes some way of assigning each item some sort of relevance scores and some way of showing items based on the scores, so that subsets of the material can be viewed depending on what issue one wants to look at. Methods of prioritizing can vary from the very simple (e.g., labeling stories as "main" or "accessory") to the complex (e.g., rating each story on three or four dimensions of priority such as "strength of feeling" and "percentage of people responding").

Sensemaking Phase

The term "sensemaking" has various shades of meaning but in general refers to the construction of meaning through interpretation and action at individual and group levels. Sensemaking provides "a way of thinking about diversity, complexity and incompleteness that neither drowns us in a tower of Babel nor imposes homogeneity, simplicity and completeness" (Dervin 1998). An important element is the indivisible social or collective aspect of all sensemaking (and thus all understanding). Weick (1995) states the concept thus: "Knowledge is a collective social product imperfectly represented in any one mind." Language is one of the most common forms of human sensemaking. In any community the development of a common history allows more sophisticated use of language due to common use over a period of time (which conforms meaning and reduces misunderstandings) and the ability to reference the common history and to use vivid imagery (which allows complex meaning to be conveyed simply). Any sensemaking about issues or objectives that concern the community must include members of the community in order to be grounded in the reality of that community.

We refer to all those who participate in the sensemaking phase of this method as "interpreters"; these may include method practitioners, sponsors of the effort, co-discoverers, observers, workshop participants, and members of the community in general. Integration of sensemaking by all of these individuals is an important part of the method. Sensemaking venues may include small or large workshops, isolated study, reflection by community members in an asynchronous manner, and the creation of a physical or virtual "war room" of materials that persists over some time and is visited and revisited by interpreters.

We have developed several unique techniques and knowledge structures for sensemaking specifically adapted to narrative patterning. Not all of the elements described here are new, but their combination is. We can speak of the elements and processes (the nouns and verbs) of the sensemaking phase separately, though in practice these cannot be easily separated.

Sensemaking Elements

Bakhtin (1981) draws a distinction between a narrated event (an event narrated in the story) and a narrative event (the event of the narration itself). We extend that distinction beyond events to any type of element "inside" or "outside" the story proper. The first two of the four categories of narrative components used during the sensemaking phase are located "inside" the story: narrated elements and knowledge elements. The second two categories are located "outside" the story: narration elements and emergent patterns.

Narrated Elements

Narrated elements are those elements related to an anecdote's form or structure. The interpretation of narrated elements draws on the disciplines of narratology, literary and film criticism, and journalism. Two types of narrated elements are examined:

I. W-Fragments. These are the common journalistic questions of why, what, when, where and why, applied to the setting, plot and characters of the anecdote. The "why" question is the most problematic of these; it requires some interpretation and may not always be used.

II. Story feature elements. These are portions of the anecdote conforming to standard narrative plot structures. A common narrative frame (Branigan 1992) contains the following elements: an introduction of the setting and characters; an explanation of the state of affairs; an initiating event; a response or goal statement by the protagonist; complicating actions; an outcome (resolution); and reactions to the outcome. Not all short anecdotes have all portions of the canonical story form. In practice this type of anecdote interpretation is often the most useful since it uncovers other important story elements such as relationships, conflicts, and motivations.

Knowledge Elements

Knowledge elements are aspects of told anecdotes that relate to knowledge and decision making as it relates to the issues and objectives at hand. These have less to do with narrative content or context and more to do with information transfer per se. Three classifications of knowledge in anecdotes are used, as follows.

I. Knowledge disclosure points. These comprise decisions, judgments, problem resolutions and learning points. They are the points at which knowledge is used. Any individual will find it easier to recollect the use of knowledge within a series of concrete events, even if they cannot meaningfully answer the question, "What do you know?" Locating, categorizing and summarizing the KDPs in the community provides context. People may be asked, for example, "When you made that decision, what knowledge did you use?" This is an effective question in context and is more likely to reveal meaningful results than a more direct question. The use of KDPs is not detailed here but can be found described in publications (e.g., Snowden 1998a).

II. ASHEN components. The ASHEN model was created as a means of providing a linguistic framework both to help organizations identify what they know and to move directly to action as a result of the meaning provided by the language. The ASHEN components move from easily codifiable to uncodifiable components of knowledge: artifacts (codified information), skills (practiced and internalized abilities), heuristics (decision-making rules of thumb), experience (usually non-replicable accumulation of participation), and natural talent (entirely unmanageable aptitude). The use of ASHEN components is not detailed here but can be found described in publications (e.g., Snowden 2000a).

III. Experience Inflection Points. These comprise roadblocks, breakthroughs, mysteries, misconceptions, and surprises. When looking at EIPs one is studying the progress of the anecdote's protagonist towards a goal and looking for places where the story might be changed by intervention. For example, if a roadblock appears at a certain point in a series of events, what interventions might have prevented the roadblock from appearing? If a solution appears, what could one do to help others find a similar solution? Examination of these EIPs in the sensemaking effort can reveal opportunities for response.

Narration Elements

Narration elements are observations about the context of storytelling exchanges. The interpretation of narration elements draws somewhat on narratology but more heavily on anthropological methods. Two types of narrative elements are recognized, as follows.

I. Narrative affect elements. These are aspects of the anecdote's impact on its teller and audience; for example, empathy, suspense, curiosity or shock. It is useful to determine these by comparing the independent reactions of several individuals to obtain a consistent interpretation. Variation in interpretation (or lack thereof) among community members participating in group storytelling sessions is also a valuable indicator of cultural elements. For example, interaction incidents are a special class of narrative affect elements: they are "real-time" stories in that they are memorable observed incidents during group storytelling. For example, incidents of laughter in a group setting can be useful indicators of salience to the community. Laughter incidents often point to universal truths, unexpected surprises, or unspoken conflicts. Aligning subjects of laughter during group storytelling with collected anecdotes can reinforce anecdotal interpretation. Similar interpretations can be made with incidents of knowledge transfer, agreements, and disagreements.

II. Narrative community elements. Examining the roles of anecdotes in the community as well as their content can differentiate between interesting and important stories. Anecdotes can be divided into several transmission types: typical and atypical script scenarios (in the sense of Abelson 1981), firsthand and secondhand event recountings, rumors, legends, myths, and other forms Brunvald (1998) is a good source for distinctions among transmission mechanisms. For example, an anecdote that qualifies as a rumor (the same anecdote is told independently by several people, or is told in a "did you hear about this" manner, or is immediately recognized by its hearers) has special significance: it is worth passing on. One might then ask why that anecdote is worth passing on when others are not. This type of interpretation differs from examining story affect in that the origin and spread of stories in the community is examined.

Emergent Patterns

Emergent patterns are constellations above the level of any one anecdote that emerge during consideration of the body of anecdotes as a whole. The construction of emergent patterns (usually done in a group session) may involve the interpretation of some of the elements described above, along with other elements appropriate to the issues or objectives at hand. Three types of emergent pattern are recognized, as follows.

I. Archetypes. Archetypes are emergent properties of the community realized as characters or other abstracted narrative elements. Archetypes are typically described by a list of rules, values, beliefs, and other essential attributes. Rules for creating character archetypes are as follows. First, no archetype should be linked to an identifiable individual within the organization. Second, everyone hearing of the archetype should recognize the character and be able to associate it with actual behaviors with the archetype. Third, there should be significant conflict between at least two of the archetypal characters and an ability to create empathy for each character with the audience. Extraction of archetypes is intimately connected to the process of anecdotal elicitation and is one of the most useful techniques in narrative sensemaking. It is useful to work with cartoonists or actors to refine extracted archetypes. Interpreters tell the artists what they like or don't like about the drawn or acted characters; the artists add color and depth based on their understanding of representation; and together the group iterates over the archetypes until everyone agrees that they truly represent an emergent property of the community.

II. Myth subjects. Myths build up in all organisations, but they all need a sparking point or focus: the myth subject. They may relate to a visionary founder—for example, Thomas J. Watson Jr. stories still abound in IBM many years after his passing. Myths may dangerously grow around the subject of a company's competitive position or its abilities. Myths have different decay rates. A strong myth subject can mean that the decay rate is very slow; this can be seen in organizations with a long history and cohesive culture, reinforced and renewed by myths that are constantly told and retold. Myths can also decay very quickly and become anti-stories, particularly in cases of perceived hypocrisy: for example, the leader who calls for self sacrifice but travels first class. Myth subjects can be uncovered by looking for consistently mentioned persons or groups across anecdotes collected from many people.

III. Organizing principles. These are the values, rules or beliefs that provide a means of articulating the informal principles around which a community is self-organizing. As with an archetype, the truth of an organizing principle is immediately apparent to the organization concerned (and to other individuals and communities with whom that organization is connected) once it is articulated. Prior to articulation, organizing principles are implicit forces that constrain anyone within the organization (unless they are prepared to stand aside from the norm). After building archetypal characters, participants discuss the beliefs of the character and his or her likely reaction to different scenarios. In doing this one looks for key phrases or clues which summarize the underlying material. Another technique is to describe a set of organizing principles that would have produced a radically different result and look at the negation as a target candidate.

Sensemaking Processes

Making sense of a complex body of material requires simultaneous or at least sequential attention to breadth and focus. All of the sensemaking activities used in this method can be generally said to fall into two large groups: either they focus on particulars or they integrate parts to create a new larger perspective. The sensemaking phase generally consists of repeated movement between focusing and integrating processes as meanings emerge.

Focusing Processes

Focusing processes characterize individual collected or constructed items by looking into their structure and/or meaning in the particular. Two major types of focusing processes are used.

a) Attribute listing. Description of essential attributes is the most important focusing process. For example, examining an anecdote and identifying its w-fragments (who, what, when, where, why) is a focusing method, as is determining the knowledge components present in an anecdote. Attributes may be predetermined (as in the case of w-fragments) or emergent in the sense that one may look at a body of material and allow the essential attributes to become apparent from the material itself One technique is to draw potential attributes from a large list and apply only those that seem to be most "present" in the material. Emergent attribute listing draws on the methods of grounded theory (Glaser & Strauss 1967).

b) Ranking. The ranking of anecdotes or other items on predetermined or emergent scales is another method of focusing on particulars. For example, one might set up three or four predetermined dimensions of interest (such as "strength of audience response" or "degree to which decision was later consider crucial"), and give each anecdote, turning point, or other item a value for each dimension. As with attribute listing, ranking dimensions may be suggested by the material itself, in which case the ranking process will be iterative.

Integrating Processes

Integrating processes repeatedly juxtapose elements in order to allow patterns to emerge. Three methods of integration are commonly used, as follows.

a) Sorting. In this method items are sorted into predefined categories. This is used most often when one has a specific question to "ask of the data", such as the types of decisions made or the elements of knowledge exchanged. It has to be done carefully to avoid unduly biasing the categorization because of expectations and is best restricted to occasional use.

b) Clustering. Clustering is a type of classification with no a priori categories. Items are grouped together when they "seem" to fit together, and the reasons they fit together are discovered (and examined) only after the fact. Clustering may be done multiple times, with multiple participants, incorporating different material each time, in order to break apart any entrained thinking and let true similarities emerge. It is useful during a clustering exercise to assign names to clusters as a test of each cluster's integrity; if a name cannot be assigned, the cluster should be broken. Various forms of clustering are used in many design, sociological and anthropological paradigms (e.g., Beyer & Holtzblatt 1998); most of these practices are derived from the anthropological technique known as the K-J method (Kawakita 1986).

c) Construction. This is a type of integration in which artifacts are created using predetermined structures and collected material. The structures are not designed to produce a particular product, but to enhance sensemaking. Construction activities may include interaction with cartoonists, actors, or other artists who have special skill in representing conceptual aspects of constructions. Typically such interaction will be iterative, in the sense that interpreters will describe the construction to the artist, the artist will represent the construction, and the interpreters will correct the artist. During the exchange, patterns may be become apparent to the interpreters that without the help of such representation might not be visible. Three types of construction structures are used.

Sensemaking Models. These may be used to help interpreters view collected material from multiple perspectives. Interpreters may place items on named gradients or within (or between) bounded spaces; this brings conceptual relationships into spatial representations and provides a means for discourse and thought. Using sensemaking models to integrate material is much like walking through a fun house with a variety of distorting mirrors: what you see may not be what you expect or what you can easily understand, but you know more about yourself when you come out. The exact form of the sensemaking model is not as important as are the functions of multi-perspective viewing and conceptual-spatial representation.

Attribute Groupings. Particular constellations of attributes can be useful constructions for integrating collected material. Archetypes are such groupings, since each archetype is constructed by describing rules, values, and beliefs (though additional items can be added as is necessary).

Narrative Forms. Stories can be constructed using set narrative forms in order to integrate collected material. The deliberate creation of stories from anecdotal material often leads to new insights about larger patterns. For example, a fable is a complex interweaving of anecdotal material in which obvious messages are laid over subtext messages. The specific narrative forms used are described later in this document (under "purposeful story construction").

Option Formation Phase

In this phase there is a sort of grand contraction and expansion: first all of the patterns that became evident in the sensemaking phase are brought together into a small body of essential conclusions; then those conclusions are expanded out again to a large body of possible responses to the issues or objectives at hand on the basis of those conclusions. The primary goal during this phase is to generate a large and diverse body of possible options grounded in the understanding that was generated by the sensemaking phase.

The functional list of participants in option formation is generally the same as for sensemaking, though often there are fewer general community members involved in this phase. We will continue to call the participants "interpreters" since it is essentially still what is going on.

Before the option formation process begins, everyone who is to participate is brought "up to speed". This is done by presenting the results of the sensemaking (and perhaps an account of what took place), and possibly by educating some interpreters in the process of option formation.

The steps in option formation are as follows.

I. Consolidation. All of the outcomes of sensemaking are brought together (most often in one room with one group of people over one contiguous session), and a draft "construct" is prepared. The construct is a grand interpretation of the state of affairs of the community with respect to the issues or objectives that were set out to be assessed.

II. Discourse. The draft construct is presented and discussed. Its various conclusions and their integration are validated, augmented, ranked, and assessed for robustness by interpreters on a qualitative basis. The construct is improved.

III. Expansion. Using the construct as a basis, a number of possible responses are identified. This is done using some of the multi-perspective processes described for the sensemaking phase (focusing and integrating). For example, interpreters might form "theme teams", each of which approaches the construct from a different perspective and suggests responses that seem appropriate from that point of view. Responses that were identified during earlier phases of the effort are also brought to the forefront at this time.

Option Evaluation Phase

The option evaluation phase starts with a pool of possible responses, each of which may or may not be appropriate to the goals of the effort and the nature of the community. The processes of option evaluation are similar to those described above for sensemaking: focusing processes (such as ranking and description) are varied with integrating processes (such as clustering, the use of sensemaking models, and artifact construction). For example, possible responses might be clustered, and fables might be constructed around each cluster to evaluate the set of options as a possible future state.

Also important in this phase is the mapping of possible responses onto the goals and existing structures and processes of the organization or community. For example, one might build a business case for a response (or cluster of responses). Building a business case is essentially a type of artifact construction that goes beyond the collected material to consider the environment in which the responses will be carried out.

When the pool of responses has been narrowed, those remaining are assessed in more detail. Some of the things considered may be:

I. the benefits expected of the response;

II. the capabilities, resources and dependencies required to deliver the benefits; and III. how the response can be measured to determine if it has been successful, and the capabilities, resources and dependencies required to carry out the measurement.

Response Phase

The range of possible responses to states of affairs revealed by this method is enormous. We concentrate here on three categories of response around which we have developed unique methods: the construction and presentation of purposeful stories, the creation and maintenance of narrative repositories, and the creation of planning artifacts.

Purposeful Story Construction

In general the outcome of purposeful story construction and presentation is some sort of impact on a community, such as cultural change, improvement in knowledge retention, more effective initiation of new members, and so on. The identification of purposes around which to construct stories relies heavily on all earlier phases of the effort.

All well-constructed purposeful stories contain some common elements.

I. Good stories capture and hold the attention of the audience. They need not be entertaining; they might be painful or excite curiosity.

II. Good stories self-propagate; they have lives of their own and are not dependent on individual storytellers. In order to do this they need to be oral or tacit in nature, to allow each storyteller to invest his or her own authority around common structures and value themes.

III. Good stories can be told to all audiences, regardless of educational background, role or experience; and all members of the audience are able to gain meaning from them at different levels.

The construction of purposeful stories must be rooted in the raw material of the anecdotes collected from the community. By using characters, incidents and context from the narrative material, one can root a purposeful story in the community it is intended to influence. Constructing stories in isolation from this material can generate disbelief or anti-stories as the construct is too far removed from reality. For this reason it is useful for members of the community to be involved in purposeful story construction; these are most often co-discoverers who participated in the elicitation and sensemaking phases.

Two main types of method for purposeful story construction can be distinguished: those that structure story form to meet a purpose, and those that improve the effectiveness of stories in general.

Purposeful Story Form

Specific types of story form can be used to meet differing needs. These include the following.

I. Myths. Myths provide unique views on organizational culture. Long-standing myths can be captured and built upon; for example, they can be told in induction training. Normally a new member of an organization will take weeks if not months to pick up the myths that make the organization—and these are never the same as the script that is provided in induction training. Myths spontaneously occur but can also be legitimately sparked. For example, a senior executive making a speech can introduce a myth constructed using purposeful story techniques. A well-reported action, such as turning up unannounced to help out in some mundane task or unblocking bureaucracy, can also create a myth surrounding a hero figure. All such work must be linked with a continuing anecdotal elicitation process to measure both the speed of the myth's transmission and any mutation. Continuous measurement of an introduced myth permits rapid response in the event of the generation of anti-story; the faster the response the less entrenched the myth becomes.

II. Fables. Fables are distinguished from myths by their means of propagation, their length and the formality of their message. A fable is structured so as to be told by a storyteller in such a manner, and with sufficient complexity, that the audience is unable to repeat the story but remembers the message. A good fable contains a complex interweaving of anecdotal material in which the audience awaits each new peak in anticipation of a satisfactory and often surprising ending. A fable has two messages: a moral and a subtext. The moral of the fable will often be a commonsense understanding, variously taking the form of a memorable saying, quotable quote or extended lecture. The more powerful message lies in the subtext of the fable: the hidden messages contained in the way behaviors are described, in the actions of characters, and in their associations with good and evil. A powerful storyteller naturally uses subtext to convey his or her deep meaning. Because subtext is indirect it is absorbed and internalized more naturally. Fable provides a controllable way of communicating a message without the diffusion that accompanies a myth. Subtext in particular can be used to disrupt negative myths. The fable form itself can create a myth subject and its impact can be measured by collecting the myths that arise as a result of its use.

III. Virus stories. Destroying a myth with facts is notoriously ineffective; instead, one can best strengthen or combat a story with another story. Virus stories can disrupt negative myths or reinforce and build valuable myths and endorse good practice. Virus stories take considerable skill to effect and only a brief description is given here. For more details see Snowden (2000). We distinguish three forms of story virus analogous to the three forms of partnership in nature.

IV. A "predatory" virus retells an existing myth with increasing exaggeration of the message until the original myth cannot survive.

V. A "parasitic" virus retells an existing myth in a more compelling form, but in a casual and secret manner so that the myth destroys itself on subsequent retellings. Parasitic viruses are unethical and not recommended; however, it is prudent to be aware of the form.

VI. A "symbiotic" virus pursues a relationship of mutual dependency with an existing myth. Symbiotic viruses use existing story forms or myth subjects prevalent within the organisation and create new stories interwoven with the fabric of the existing story. The two symbiont stories become mutually dependent: one cannot be told without the other, but neither destroys the other. This form of story is difficult to achieve, but can be one of the most long lasting.

VII. Archetype stories. The use of archetypes to tell stories has a long history in many cultures. Construction of an archetype story starts with the process of archetype extraction described earlier. Once archetypes are isolated, they are refined and developed to the point where there are three or four strong and well-developed characters, along with a number of supporting characters. Universal or idealized archetypal characters can be drawn from the anecdotal base of the organization with which one is working; thus they will have immediate and lasting relevance, and they will gain traction quickly with the community. Archetype stories are one of the most long-lasting of the story forms and one of the most easily integrated with other forms of communication. For example, they can be used in organizational newsletters, in orientation materials, and in educational resources. The benefits of this type of story spread beyond one communication event; they also introduce a private symbolic language to the community. An employee might simply say, "You're doing a George" (where George is an archetypal character associated with a particular behavioral style), and a complex understanding can be quickly invoked. Archetypal stories can also be used to discuss differences between the official and actual stories of an organization by asking employees to tell official stories from the point of view of archetypal characters (e.g., "What would George do?"). With archetypal stories people can explore fictional space and tell the truth without attributing blame, increasing the overall learning capability of the organization (Snowden 2000a).

VIII. Disruptive metaphor stories or environments. This method works in a similar way to the use of the *Longitude* example described earlier. An environment is designed which shares metaphorical aspects with the environment in which people are working but is altered in ways that disrupt their predominant mental models. For example, one might create a scenario or game in which managers face their own organization in metaphorical form: as an alien species on a planet they must navigate; as members of a wolf pack they have joined; as a seafaring crew. The combination of deep metaphorical similarity (behavior) and surface-level dissimilarity (appearance) disrupts assumptions and defenses to help people see their current position from a new perspective.

General Story Improvement

The following methods are used for improving the general effectiveness of a story in persuading, informing, or elucidating.

I. Narrative form. Much literature exists on the construction of dramatically powerful stories; McKee's *Story* (1992) is a useful reference.

II. Actor realization. Having actors play out improvisational skits based on purposeful stories can help improve the stories by pointing out flaws and gaps.

III. Multiple retelling. Refinement of stories through multiple tellings can suit them more closely to the audience and purpose at hand, much as professional storytellers develop a unique relationship with the stories they tell.

Dissemination Methods for Purposeful Stories

Once purposeful stories are created, they must be disseminated in the community. Depending on the purpose of story creation, any of several methods may be most appropriate. In general, moving purposeful stories through a community is best done by using the community's own social energy; self-propagating stories have the greatest impact for the least effort. Dissemination methods include the following.

I. Performance. Purposeful stories might be performed by actors (as skits) or by professional storytellers at community events or through media.

II. Publication. Purposeful stories might be distributed in the community in a series along with other information, perhaps in a newsletter or web site. The use of a serial, soap-opera style can help make the stories more compelling.

III. Storytelling by leaders. Community leaders might learn some storytelling techniques and tell purposeful stories at formal meetings and speeches as well as in more casual settings.

IV. Casual telling by non-leaders. Stories might be simply "dropped" into the community through letting people "hear" them.

V. Knowledge resources. Stories might be placed in a repository for use by community members to meet various needs.

VI. Educational resources. Stories might form an integral part of an educational system, linking with how-to information to provide context and memorability.

Narrative Repository Creation

A complement to purposeful story construction is the creation of repositories that start with or are inspired by the narrative material collected in the effort. Narrative is not just about telling, constructing or even eliciting stories; it is about allowing the patterns of culture, behavior and understanding that are revealed by stories to emerge. Following facilitation of that emergence, it is often advisable to create an overall ecology in which the patterns of narrative and the patterning capability of narrative responses is managed in the way a gardener manages a garden, not the way an engineer designs a machine. The elicitation of stories in this method may be just the beginning of such an ecology.

Many of the elicitation and sensemaking methods used in this method can also inform the creation and maintenance of narrative repositories. For example:

I. Archetypal elicitation methods can encourage people to talk about failures and embarrassing incidents as well as "success stories".

II. Disruptive metaphor can move the discussion to a place where deep truths can be obliquely referenced.

III. Multi-perspective games can break up entrained thinking and encourage discourse around issues that might not otherwise be addressed.

IV. Sensemaking models can be used as aids to comprehension, navigation and reflection.

V. The indexing of material through emergent characteristics derived from the organization itself can speed integration of new material.

Four general categories of narrative repositories are distinguished.

I. Knowledge exchange repositories. These are used in knowledge transmission, with lessons learned, best practices, technical know-how, and other knowledge components. Such repositories can replace intellectual capital management programs by helping people share experiences rather than formulae.

II. Historical repositories. These are used for oral and written history, with remembrance, reflection and dialogue among past, present and future members of the organization or community.

III. Induction repositories. These are used in the introduction of new members of the organization or community. They may include stories submitted by members, say, at different stages in their membership, or archetypal stories that help new members understand the unwritten rules of the community.

IV. Advanced decision support repositories. These are designed for use in situations where decision makers with little time (and possibly a restricted perspective) must have ready access to much complex and multi-perspective material.

Planning Artifact Creation

This category of response is appropriate when the goal of the effort has more to do with envisioning the future than having an immediate effect on the community. Planning resources typically take the form of reports, recommendations, targets, mappings, and the like.

We claim:

1. A method for assessing and affecting the state of affairs within and among given organizations and communities with respect to given issues or objectives the method makes use of narrative patterns to assess and affect the state of affairs within and among given organizations and communities with respect to given issues or objectives;

initiation, in which various preparatory, selective, exploratory and purpose-setting activities are carried out as needed;

elicitation, in which narrative material is collected from the given organizations or communities;

storing in storage, in which the narrative material is indexed and arrayed in such a way as to be useful to the method;

common sensemaking, in which the given organizations or communities come to a collective understanding of patterns emergent in the collected narrative material which address the issues or objectives at hand;

option formation, in which various possibilities for appropriate response are identified;

option evaluation, in which the identified options are characterized, appraised and prioritized; and response, in which an action is taken in order to affect the state of affairs;

wherein the elicitation integrates observation, interviewing, and group sessions as needed to provide a large, diverse, and representative narrative base with which to examine the given issues or objectives in the given organizations or communities;

wherein the group sessions follow any of four distinct formats depending on the experience of facilitators, the time available, the completeness of outputs desired, and the purpose of the session, comprising:

a story circle unstructured format in which skilled facilitators choose among several narrative techniques depending on the purpose and flow of the session;

a story roundtable structured format in which unskilled facilitators guide participants in relating narratives while choosing favorite or best narratives;

a self-running semi-structured format in which participants follow a game-like set of instructions (selected from the group consisting of printed and multimedia materials) and take part in various narrative activities, reporting their results with little or no facilitation; and a virtual story gathering online format in which participants relate narratives and discuss issues using electronic means, integrating synchronous and asynchronous and optimally anonymous communications.

2. The method of claim 1, wherein the initiation phase includes initial collection of narrative material which informs the setting of purpose for the effort.

3. The method of claim 1, wherein the initiation phase includes the selection and education of co-discoverers, or members of the given organizations or communities who will participate in the elicitation of narrative material.

4. The method of claim 1, wherein the initiation phase includes the use of a plurality of information gathering activities such as interviews and social network analysis to inform the selection of participants and co-discoverers.

5. The method of claim 1, wherein the initiation phase includes the choice of a target mix of roles designed to maximize storytelling potential, which creates conditions for knowledge exchange greater than those that would be obtained by bringing together participants with other backgrounds.

6. The method of claim 1, wherein the initiation phase includes the holding of covenanting meetings in which issues, scope, purpose, and contributions are discussed and agreed upon by method practitioners, co-discoverers, sponsors, and other involved individuals and groups.

7. The method of claim 1, wherein the elicitation phase minimizes the collection of stories which exhibit camouflage behavior and conform to official scripts.

8. The method of claim 1, wherein the elicitation phase minimizes the collection of non-meaningful narrative responses that typically result from poorly articulated instructions and popular misconceptions about narrative; these responses comprise opinions, lies, jokes, children's stories, and Hollywood stories.

9. The method of any one of claims 7 to 8, wherein story circle sessions include the use of dit spinning activities, in which participants tell escalating fish tale narratives.

10. The method of any one of claims 7 to 8, wherein story circle sessions include the use of alternative history activities, in which participants construct alternative anecdotes arising from turning points identified in existing anecdotes.

11. The method of any one of claims 7 to 8, wherein story circle sessions include the use of shifting character or context activities, in which participants alter significant aspects of character, selling, plot or other story elements and tell or retell anecdotes from different perspectives.

12. The method of any one of claims 7 to 8, wherein story circle sessions include the use of archetypal story elicitation activities, in which participants tell or retell anecdotes using archetypal elements such as fictional characters.

13. The method of any one of claims 7 to 8, wherein story circle sessions include the use of story construction activities, in which participants construct stories of various forms (e.g., fables, myths) using anecdotes as source material and according to purposeful templates.

14. The method of any one of claims 7 to 8, wherein story circle sessions include the use of role playing activities, in which participants act out the parts of characters in anecdotes or constructed stories.

15. The method of any one of claims 7 to 8, wherein story circle sessions include the use of metaphorical elicitation activities, in which participants tell or retell narratives using altered metaphorical contexts.

16. The method of any one of claims 7 to 8, wherein story circle sessions include the use of best or worst event identification activities, in which participants tell or retell narratives that feature high or low points in a series of historical events.

17. The method of any one of claims 7 to 8, wherein story circle sessions include the use of event or situation drawing activities, in which participants draw conceptual images of events, characters, archetypes, situations, and the like.

18. The method of any one of claims 7 to 8, wherein story circle sessions include the use of actor training activities, in which participants instruct actors in how to play out characters in anecdotes or constructed stories.

19. The method of any one of claims 7 to 8, wherein story circle sessions include the use of cartoonist training activities, In which participants instruct cartoonists in drawing conceptual images of events, characters, archetypes, situations, and the like.

20. The method of any one of claims 7 to 8, wherein story roundtable sessions rely on some combination of two or more of the following aspects which are specifically designed to maximize storytelling: a) the management of expectations; b) the mix of participants; c) the modeling of storytelling behavior; d) the combination of small and large group processes; e) the indirect suggestion of storytelling behavior; and f) explicit attention to group interactions.

21. The method of any one of claims 7 to 8, wherein story roundtable sessions Include the use of preparatory materials which orient participants to the nature of the activities.

22. The method of any one of claims 7 to 8, wherein story roundtable sessions include the special preparation of people who are participating in the roundtable but typically are seen by others as advice givers, in roles such as trainers and support staff.

23. The method of any one of claims 7 to 8, wherein story roundtable sessions include the use of physical manipulables that stimulate discussion and provide a common ground for reference.

24. The method of claim 23, wherein physical manipulables include two or more of the following parts:
   a) memory joggers, or facts about the subject domain under discussion;
   b) story starters, or incomplete phrases that, when completed, start a story
   c) experience inflection points, or roadblocks, breakthroughs, mysteries, misconceptions, and surprises.

25. The method of any one of claims 7 to 8, wherein story roundtable sessions include the use of "gifting", or the distribution of unexpected small rewards at the start of the session to engender a reciprocatory response.

26. The method of any one of claims 7 to 8, wherein story roundtable sessions include the use of a self-fulfilling prophecy, or the combination of an observation that stories tend to occur with the avoidance of direct requests for storytelling, in order to create a natural environment for spontaneous storytelling.

27. The method of any one of claims 7 to 8, wherein story roundtable sessions include the use of a modeled story, or an example story told to engender natural storytelling.

28. The method of claim 27, wherein the modeled story is chosen by a two-step process, the steps comprising:
   a) the identification of characteristics required for the modeled story to be instructive, exemplary, engaging, and conducive to follow-up storytelling; and
   b) the selection of the modeling story exclusively by the facilitator who is to tell it in the story roundtable so that it can be imbued with personal meaning.

29. The method of claims 28, wherein the modeled story is practiced and developed by the facilitator who is to tell it in the story roundtable in various venues so that it becomes a successful catalyst for group storytelling.

30. The method of any one of claims 7 to 8, wherein story roundtable sessions include the use of cover, which is background noise, music or conversation which creates a cocktail party atmosphere within which small groups are more likely to fall into spontaneous storytelling.

31. The method of any one of claims 7 to 8, wherein story roundtable sessions include the use of a preparation trick, in which small groups of people are asked to tell each other stories in order to choose a best or most interesting narrative, but the real purpose of the small-group work is the collection of spontaneous stories that arise before consideration of the "quality" of stories entrains the outcome of the exercise.

32. The method of any one of claims 7 to 8, wherein self-running sessions include the use of "concurrent streams" of explanation at different levels, so that participants can elect to receive more or less instruction as they carry out the activities.

33. The method of any one of claims 7 to 8, wherein self-running sessions include the use of "multi-perspective games" which enhance multiple perspective taking and avoid entrainment and groupthink.

34. The method of any one of claims 7 to 8, wherein self-running sessions include the use of "accumulation", or the use of output from some group sessions in the input of other group sessions, in order to catalyze emergence of global patterns from many such sessions.

35. The method of any one of claims 7 to 8, wherein virtual story gatherings include the use of anonymity for safety in disclosure.

36. The method of any one of claims 7 to 8, wherein virtual story gatherings include the use of multiple persona for safe experimentation and disclosure.

37. The method of claim 1, wherein the storage phase includes the indexing of narrative material by distinctions central to the elicitation and sensemaking phases (such as archetypes, metaphors, turning points, and the like).

38. The method of claim 1, wherein the storage phase includes the capability of multi-perspective viewing of the narrative material in relation to any of the important dimensions of sensemaking, either juxtaposed or sequential.

39. The method of claim 1, wherein the storage phase includes the assignment of relevance scores on important dimensions and selective viewing of items based on relevance to given issues.

40. The method of claim 1, wherein the sensemaking phase includes the integration of participatory workshops including members of the given organization or community and isolated study by method practitioners and/or co-discoverers (all people contributing to sensemaking are termed "interpreters").

41. The method of claim 1, wherein the sensemaking phase includes the interpretation of "narrated elements", or those elements that relate to an anecdote's form or structure.

42. The method of claim 41, wherein interpreted narrated elements may include w-fragments, or who, what, where, when, and why.

43. The method of any one of claims 41 or 42, wherein interpreted narrated elements may include story feature elements, or portions of anecdotes conforming to standard narrative plot structures.

44. The method of claim 1, wherein the sensemaking phase includes the interpretation of knowledge elements, or aspects of told anecdotes that relate to knowledge and decision making as it relates to the Issues and objectives at hand.

45. The method of claim 44, wherein interpreted knowledge elements may include knowledge disclosure points, or decisions, judgments, problem resolutions and learning points.

46. The method of claim 45, wherein interpreted knowledge elements may include ASHEN components, or artifacts, skills, heuristics, experience, and natural talent.

47. The method of any one of claims 44, 45 or 46, wherein interpreted knowledge elements may include "experience inflection points", or roadblocks, breakthroughs, mysteries, misconceptions, and surprises.

48. The method of claim 1, wherein the sensemaking phase includes the interpretation of narration elements, or observations about the context of storytelling exchanges.

49. The method of claim 48, wherein interpreted narration elements may include narrative affect elements, or aspects of the anecdote's impact on its teller and audience.

50. The method of any one of claims 48 or 49, wherein interpreted narration elements may include narrative community elements, or the roles of anecdotes in the community.

51. The method of claim 1, wherein the sensemaking phase includes the interpretation of emergent patterns, or constellations above the level of any one anecdote that emerge during consideration of the body of anecdotes as a whole.

52. The method of claim 51, wherein interpreted emergent patterns may include archetypes, or sets of rules, values, beliefs and other attributes which represent extreme characterizations of significant cultural forces within the community.

53. The method of any one of claims 51 or 52, wherein interpreted emergent patterns may include myth subjects, or entitles (typically people or groups) around which myths persist in the given organization or community.

54. The method of any one of claims 53, wherein interpreted emergent patterns may include organizing principles, or simple unspoken rules which create emergent properties in the given organization or community.

55. The method of claim 1, wherein the sensemaking phase includes movement between two types of process:
   a) focusing processes, or processes that characterize individual collected or constructed items by looking into their structure and/or meaning in the particular, and
   b) integrating processes, or processes that repeatedly juxtapose elements in order to allow meaningful patterns to emerge.

56. The method of claim 55, wherein focusing processes include attribute listing, or the description of essential attributes of interpreted items.

57. The method of any one of claims 55 or 56, wherein focusing processes include the ranking of items on predetermined or emergent scales.

58. The method of claim 55, wherein integrating processes include the sorting of hems into predetermined categories.

59. The method of claim 55, wherein integrating processes include clustering, or the classification of items with no a priori categories.

60. The method of claim 55, wherein integrating processes include the construction of integration artifacts, or artifacts created for the purpose of sensemaking during integration of material, using predetermined structures and collected material.

61. The method of claim 60, wherein sensemaking models, or conceptual models whose use creates multi-perspective views that improve sensemaking, are used in the construction of integration artifacts.

62. The method of claims 60 or 61, wherein attribute groupings, or lists of attribute types that when brought together bring insights Into larger patterns, are used in the construction of integration artifacts.

63. The method of claim 62, wherein "narrative forms", or structured story templates, are used in the construction of integration artifacts.

64. The method of claim 63, wherein the construction of integration artifacts may include the interaction of interpreters with cartoonists, actors, or other people skilled in creating representations, who draw or act out or otherwise represent the constructions iteratively while receiving feedback from interpreters.

65. The method of claim 1, wherein the formation of options phase includes the consolidation of all interpretations arrived at during the sensemaking phase into a "construct", or grand interpretation.

66. The method of claim 1, wherein the formation of options phase includes the identification of many possible responses through the use of the focusing and integration methods used during the sensemaking phase.

67. The method of claim 1, wherein the evaluation of options phase includes the use of the focusing and integration methods used during the sensemaking phase.

68. The method of claim 1, wherein the evaluation of options phase includes the mapping of possible responses onto the goals and existing structures and processes of the organization or community.

69. The method of claim 1, wherein the response phase includes the construction of purposeful stories from the collected narrative material.

70. The method of claim 69, wherein the construction of purposeful stories includes the integration of participatory workshops including members of the given organization or community and isolated creation by participants selected from the group consisting of method practitioners and co-discoverers.

71. The method of claim 70, wherein the construction of purposeful stories is guided by the use of a narrative form.

72. The method of claim 70, wherein the narrative forms include the myth form, in which the story contains a simple message and spreads rapidly because it reveals an essential truth.

73. The method of claim 70, wherein the narrative forms include the fable form, in which the story is complex and not easily remembered, yet contains a subtle subtext message that is internalized naturally.

74. The method of claim 70, wherein the narrative forms include the virus form, in which the story interacts with existing myths, either enhancing or reducing their power in the community.

75. The method of claim 70, wherein the narrative forms include the archetype form, a group of which stories represent emergent forces in the community and create a private symbolic language through which complex understandings can be quickly invoked.

76. The method of claim 70, wherein the narrative forms include the disruptive metaphor form, in which the combination of deep metaphorical similarity and surface-level dissimilarity disrupts assumptions and engenders multi-perspective thinking.

77. The method of claim 70, wherein the construction of purposeful stories is guided by the use of methods for general story improvement.

78. The method of claim 77, wherein the construction of purposeful stories is guided by the use of actor realization, or having actors play out improvisational skits based on purposeful stories.

79. The method of claims 77 or 78, wherein the construction of purposeful stories is guided by the use of multiple retelling, or refinement of stories through repeated tellings.

80. The method of claim 70, wherein the construction of purposeful stories is followed by the dissemination of those stories within and among the given organizations and communities.

81. The method of claim 80, wherein the method of story dissemination includes the performance of purposeful stories by actors or professional storytellers at community events or through media.

82. The method of claim 80, wherein the method of story dissemination Includes the telling of purposeful stories by organization or community leaders at formal meetings and in casual settings.

83. The method of claim 79, wherein the organization or community leaders are trained in the techniques of oral storytelling so that they can subtly transmit the purposeful stories.

84. The method of claim 80, wherein the method of story dissemination includes the casual telling of purposeful stories by dropping them in community gathering places.

85. The method of claim 80, wherein the method of story dissemination includes the incorporation of purposeful stories into knowledge exchange resources such as intellectual capital management or knowledge management systems.

86. The method of claim 80, wherein the method of story dissemination includes the incorporation of purposeful stories into educational resources.

87. The method of claim 1, wherein the response phase includes the creation of repositories of narrative material for direct engagement by members of the organizations or communities.

88. The method of claim 87, wherein said narrative repositories make use of archetypal elicitation methods to encourage people to talk about failures and embarrassing incidents as well as success stories.

89. The method of claim 87, wherein said narrative repositories make use of disruptive metaphor to move the discussion to a place where deep truths can be obliquely referenced.

90. The method of claim 87, wherein said narrative repositories make use of multi-perspective games to break up entrained thinking and encourage discourse around issues that might not otherwise be addressed.

91. The method of claim 87, wherein said narrative repositories make use of sensemaking models as aids to comprehension, navigation and reflection.

92. The method of claim 87, wherein said narrative repositories make use of the indexing of material through emergent characteristics derived from the organization itself.

93. The method of claim 87, wherein said repositories are designed to be used in knowledge transmission with lessons learned, best practices, technical know-how, and other knowledge components.

94. The method of claim 87, wherein said repositories are designed to be used in oral and written history, with remembrance, reflection and dialogue among past, present and future members of the organization or community.

95. The method of claim 87, wherein said repositories are designed to be used in the induction of new members of the organization or community.

96. The method of claim 87, wherein said repositories are designed to be used in advanced decision support, where decision makers with little time must have ready access to much complex and multi-perspective material.

97. The method of claim 1, wherein the response phase includes the creation of planning artifacts.

* * * * *